(12) United States Patent
Ware et al.

(10) Patent No.: US 12,373,333 B2
(45) Date of Patent: *Jul. 29, 2025

(54) MEMORY SYSTEM WITH ACTIVATE-LEVELING METHOD

(71) Applicant: Rambus Inc., San Jose, CA (US)

(72) Inventors: Frederick A. Ware, Los Altos Hills, CA (US); Craig E. Hampel, Los Altos, CA (US)

(73) Assignee: Rambus Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/408,355

(22) Filed: Jan. 9, 2024

(65) Prior Publication Data

US 2024/0232064 A1    Jul. 11, 2024

Related U.S. Application Data

(63) Continuation of application No. 17/673,277, filed on Feb. 16, 2022, now Pat. No. 11,899,571, which is a continuation of application No. 16/214,558, filed on Dec. 10, 2018, now Pat. No. 11,256,613, which is a continuation of application No. 14/566,411, filed on Dec. 10, 2014, now Pat. No. 10,152,408.

(60) Provisional application No. 61/941,865, filed on Feb. 19, 2014.

(51) Int. Cl.
*G06F 12/02*      (2006.01)

(52) U.S. Cl.
CPC .......... *G06F 12/02* (2013.01); *G06F 12/0292* (2013.01)

(58) Field of Classification Search
CPC .............................. G06F 12/02; G06F 12/0292
See application file for complete search history.

(56) References Cited

U.S. PATENT DOCUMENTS

| | | | |
|---|---|---|---|
| 4,748,627 | A | 5/1988 | Ohsawa |
| 5,293,631 | A | 3/1994 | Rau et al. |
| 6,192,457 | B1 | 2/2001 | Porterfield |
| 6,441,641 | B1 | 8/2002 | Pang et al. |
| 6,490,225 | B1 | 12/2002 | Millar et al. |
| 6,681,283 | B1 | 1/2004 | Thekkath et al. |
| 7,355,909 | B2 | 4/2008 | Cohen |
| 7,984,329 | B2 | 7/2011 | Lastras-Montano et al. |
| 8,069,377 | B2 | 11/2011 | Singh |
| 8,301,826 | B2 | 10/2012 | Gonzalez et al. |
| 8,347,176 | B2 | 1/2013 | Resnick et al. |
| 2003/0065899 | A1 | 4/2003 | Gorobets |
| 2003/0149700 | A1 | 8/2003 | Bolt |
| 2004/0215897 | A1 | 10/2004 | Arimilli et al. |

(Continued)

*Primary Examiner* — Tasnima Matin
(74) *Attorney, Agent, or Firm* — Lowenstein Sandler LLP

(57) ABSTRACT

Improvements are disclosed for "leveling" or averaging out more evenly the number of activate/precharge cycles seen by the rows of a memory component, so that one or more particular rows are not excessively stressed (relative to the other rows). In one embodiment, a memory controller includes remapping facilities arranged to move data stored in a physical row from RPK to RPK' and modify the mapping from logical row RLK while minimizing impact on normal read/write operations. Remapping operations may be scheduled relative to refresh or other maintenance operations. Remapping operations may be conditionally deferred so as to minimize performance impact.

20 Claims, 6 Drawing Sheets

(56) References Cited

U.S. PATENT DOCUMENTS

| | | |
|---|---|---|
| 2006/0106972 A1 | 5/2006 | Gorobets et al. |
| 2006/0106982 A1 | 5/2006 | Ashmore et al. |
| 2008/0077767 A1 | 3/2008 | Khosravi et al. |
| 2008/0229025 A1* | 9/2008 | Plamondon ......... G06F 12/0862 709/218 |
| 2009/0089485 A1 | 4/2009 | Yeh |
| 2009/0125678 A1 | 5/2009 | Tokuda et al. |
| 2009/0316501 A1* | 12/2009 | Bunker ................. G11C 29/70 365/201 |
| 2010/0161923 A1 | 6/2010 | GadelRab |
| 2010/0174845 A1 | 7/2010 | Gorobets et al. |
| 2010/0191923 A1* | 7/2010 | Archer ............... G06F 12/1036 711/E12.001 |
| 2012/0030415 A1* | 2/2012 | Selfin .................. G06F 3/0647 711/E12.008 |
| 2012/0233397 A1 | 9/2012 | Keren et al. |
| 2012/0324141 A1 | 12/2012 | Seong et al. |
| 2014/0173180 A1 | 6/2014 | D'Abreu et al. |
| 2014/0173234 A1* | 6/2014 | Jung .................... G06F 3/0688 711/162 |
| 2015/0149728 A1* | 5/2015 | Moon .................. G06F 12/123 711/133 |

\* cited by examiner

MEMORY SYSTEM WITH ACTIVATE-LEVELING METHOD

RELATED APPLICATIONS

This application is a continuation application of U.S. application Ser. No. 17/673,277, filed Feb. 16, 2022, which is a continuation application of U.S. application Ser. No. 16/214,558, filed Dec. 10, 2018, now U.S. Pat. No. 11,256,613, which is a continuation application of U.S. application Ser. No. 14/566,411, filed Dec. 10, 2014, now U.S. Pat. No. 10,152,408, issued Dec. 11, 2018, which claims the benefit to U.S. Provisional Patent Application Ser. No. 61/941,865, filed Feb. 19, 2014, which are hereby incorporated in its entirety herein by reference.

TECHNICAL FIELD

We describe improvements for random access memory systems and memory controllers.

BACKGROUND OF THE INVENTION

In random access memories, a memory access sequence (for example, a read or write operation) typically proceeds as follows. An activate command opens a row (selected by row address decoding). A read or write command reads/writes data in a column of the open row (or in a corresponding row buffer), and finally a precharge command closes the row and prepares the bank for a next access. Each activate/precharge cycle of a memory component is a stress event, generating electric fields and current flow across junctions, dielectric layers and conductors. Over time, these stress events may lead to a hard failure, particularly in the rows that are accessed most frequently.

DETAILED DESCRIPTION

Figure 1:
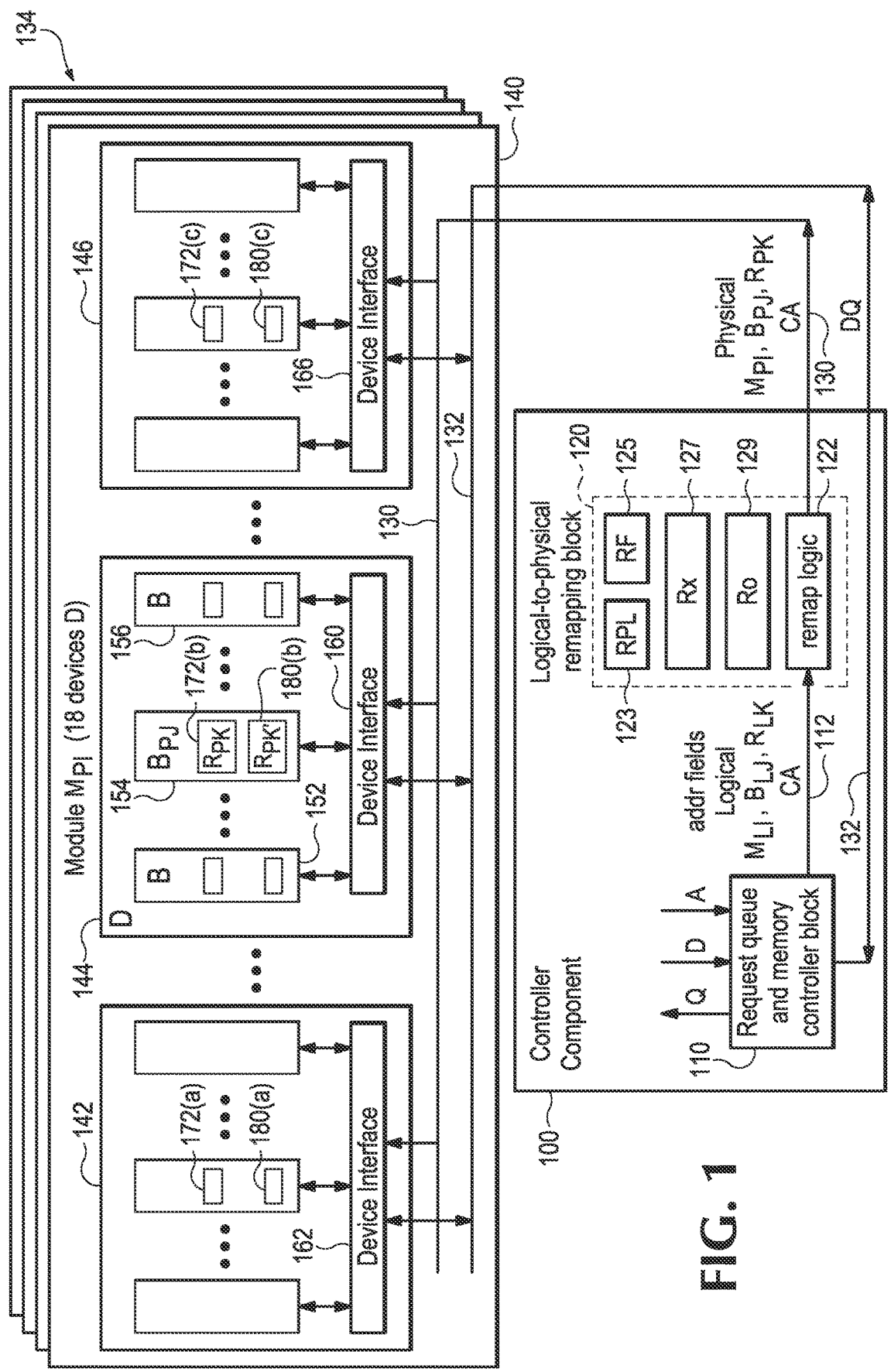
FIG. 1 is a simplified block diagram of a memory system comprising a controller component and at least one memory module, consistent with the present disclosure.

FIG. 1 is a simplified block diagram of a memory system comprising a controller component 100 coupled to a memory component 134. The memory component 134 may comprise a plurality of memory modules, for example module 140. In the controller component 100 a request queue and memory controller block 110 generates logical address field values of from a memory requests as is conventional. The commands in logical addresses (CA) are provided to a logical to physical remapping block 120. The remapping block 120 may include internal remap logic 122 discussed in more detail later. A data bus (DEQ) 132 extends from the controller block 110 to the memory 134. The data bus is numbered 132 for future reference.

In this example, the memory module 140 comprises a plurality of memory devices, for example DRAM devices 142, 144, 146. The memory 134 will be discussed herein in some detail by way of illustration and not limitation. The present disclosure can be applied to many different memory configurations. In the present example, the memory 134 comprises four modules, including module 140. Memory module 140 may comprise 18 devices (D), of which three are shown (142, 144, 146) to simplify the illustration. Each memory device (D), for example device 144, may comprise a series of memory banks, of which three banks are shown (152, 154, 156), again to simplify the illustration.

Within each device D, a device interface is provided. To illustrate, in device 144, each of the memory banks 152, 154, 156 is coupled to the device interface 160 which, in turn, is coupled to the CA bus 130 and the DQ bus 132, which are common to the entire memory 134 as is known. Similarly, the banks in devices 142 and 146 are coupled to the corresponding device interfaces 162, 166, respectively; and those device interfaces are coupled to the common CA 130 and DQ 140 buses as well.

In general, in operation, the request queue and memory controller block 110 in the controller component 100 would generate logical address fields for accessing the memory 134 responsive to a request in the request queue. For example, a memory request or access request may be generated by a processor or other host user. Typically, the logical address fields generated by the controller block 110 may comprise logical module, bank, and row values. For illustration, these values are shown in the drawing as $M_{LI}$, $B_{LJ}$, and $R_{LK}$ respectively. In operation, the logical address is input to the logical-to-physical (LTP) remapping block 120, which remaps the logical address to a new (remapped) physical address, labeled $M_{PI}$, $B_{PJ}$, $R_{PK}$ respectively for reference. The remapped physical address may be applied, directly or indirectly, to the CA bus 130 to access the memory 134.

A full row, or a subset of a row may be remapped in connection with one or more access operations. In the present example of FIG. 1, the memory module 140 is assumed to have the address am $M_{PI}$. In module 140, device 144, the middle bank 154 is assumed to have address be $B_{PJ}$. In bank 154, the physical row address ($R_{PK}$) 172(a) is remapped to row $R_{PK}'$, labeled 180(b). Similarly, in this example, the same row 172(a) in device 142 is remapped to 180(a); and row 172(c) in device 146 is remapped to row 180(c).

The "target" remapping locations may be selected with a view to leveling out the number of activation/precharge cycles seen by each row of a memory component so a particular row is not excessively stressed (relative to the other rows). Preferably, the memory component itself need not be changed to take advantage of our remapping strategy. That is, the methods and apparatus disclosed herein may be used with standard ("off the shelf") memory components, now existing or developed in the future. In other embodiments, described below, limited modifications to standard memory component designs may be used to advantage with regard to activate leveling. Illustrative strategies to achieve these and other goals are discussed in more detail later. Next we will describe, by way of example, operation of the remapping logic 122 [or the LTP remapping block 120?] of the controller component 100 of FIG. 1.

Figure 2:
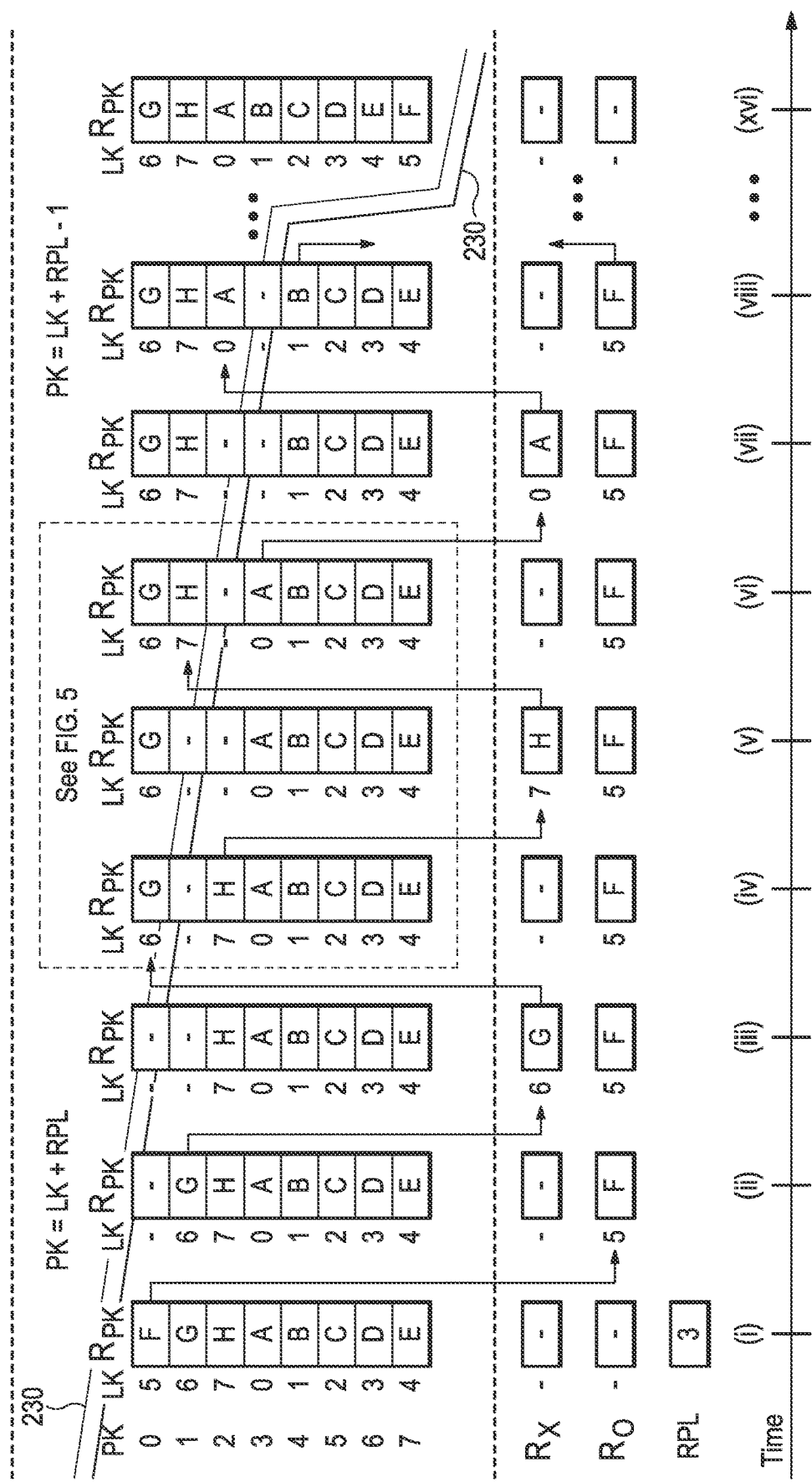
FIG. 2 is a conceptual diagram illustrating a remapping process for moving data in a memory bank to new physical row locations while maintaining association of each row with a corresponding logical address.

Referring now to FIG. 2, it presents a conceptual diagram to further illustrate a remapping process for moving data in a memory bank to new physical row locations while maintaining association of each row with a corresponding logical address. In this illustration, we assume eight rows of memory per bank, the physical rows numbered PK=0 to PK=7. A series of "snapshots" are shown of the contents of memory bank $B_{PJ}$ of the Module $M_{PI}$ (140) of FIG. 1, with time progressing from left to right in the drawing. The snapshots are identified by sequential lower case roman numerals. At a high level, the remapping logic processes through the memory, one row (or preferably, part of a row) at a time, moving the current data to a new (remapped) row location. After processing a last row in the bank, the process loops around to begin anew at the first row, in circular fashion. Timing and performance considerations are discussed later. As will be shown, correct data is returned (or written) in response to an access request, even if the affected row transfer is incomplete at the time the request is serviced.

A variable RPL (see register 123 in FIG. 1) maintains a row offset pointer or counter. In this example, RPL equals 3—the offset between the logical row number LK and the physical row number PK. (The offset value RPL=3 is not critical; in fact it is arbitrary.) Thus PK=LK+RPL (modulo 7) prior to remapping. As data is remapped, it is moved down one physical row, in this example, say from PK=2 to PK=1. Accordingly, for rows that have been remapped, PK=LK+RPL−1.

In general, the remapping logic can remap any physical row to any other (available) physical row. Destination rows may be selected at random, or pseudo-randomly, or using some other algorithm. These or other, more complex remapping algorithms can be used to improve security against malicious attack.

In an embodiment, another variable RF (maintained, for example, in a register or counter value, see 125 in FIG. 1) keeps track of the remapping progress through the bank. The RF value may reflect the last row remapped or the next row to be remapped, for example. The value of RF is indicated as line 230 in FIG. 2. Thus, the remapped physical location is calculated at PK=LK+RPL−1 for locations where RF indicates the row LK has been remapped.

Referring again to FIG. 2, in the first snapshot (i), all of the PK memory locations are storing data, represented by respective letters A-G. The corresponding logical LK row numbers are indicated, sequential but offset from the PK row numbers as noted—plus 3 modulo 7. Thus, the first logical location LK=5 maps to PK=0 in the first snapshot.

To begin remapping, the data F in row LK=5 (PK=0) is saved into a holding data register Ro (illustrated at 129 in FIG. 1). The result appears in the second snapshot (ii), where row PK=0 is now empty or available, and the data F are shown as stored in the register Ro. Logical row LK=6 (PK=1) is selected for remapping next, proceeding in ascending sequential order. (That said, the sequence of remapping is not critical; sequential operations tend to simplify implementation.) The PK=1 data G is moved to a coherency data register Rx (illustrated at 127 in FIG. 1). The resulting state is shown in the third snapshot (iii). This step will keep the data G available in case it is needed before the remapping process is completed, as explained below.

Next, at snapshot (iv), the data G is moved from the coherency data register RX into the available physical row PK=0. The previous data F from row 0 remains stored in the holding data register Ro. In this way, data G and the corresponding logical row LK=6 have been remapped to a new physical location.

Next, data H corresponding to LK=7 (PK=2) is copied into the coherency register RX, snapshot (v). Then, the data is copied from register RX into a new physical location PK=1. This process continues in similar fashion, as illustrated in snapshots (vi), (vii), (viii) moving each row of data into a new location, while maintaining association to the correct logical row. Remapping data G, H, and A is shown. Remapping the remaining data B, C, D and E is conducted in the same fashion, indicated by the three horizontal dots to the right of snapshot (viii) in the drawing. Finally, the LK=5 data F is restored from the holding data register Ro to PK=7, snapshot (xvi).

The cost impact of the illustrated example may be on the order of about 1 Mb SRAM storage on the controller for registers Rx, Ro, and mapping control logic estimated to be on the order of 3 k gates. We assume in this example 18×4 devices per memory component (134 in FIG. 1), 2 Gb per device, 8 banks per device, 14 k rows per bank, and 32 k bits per row.

Figures 3A, 3B, 4:
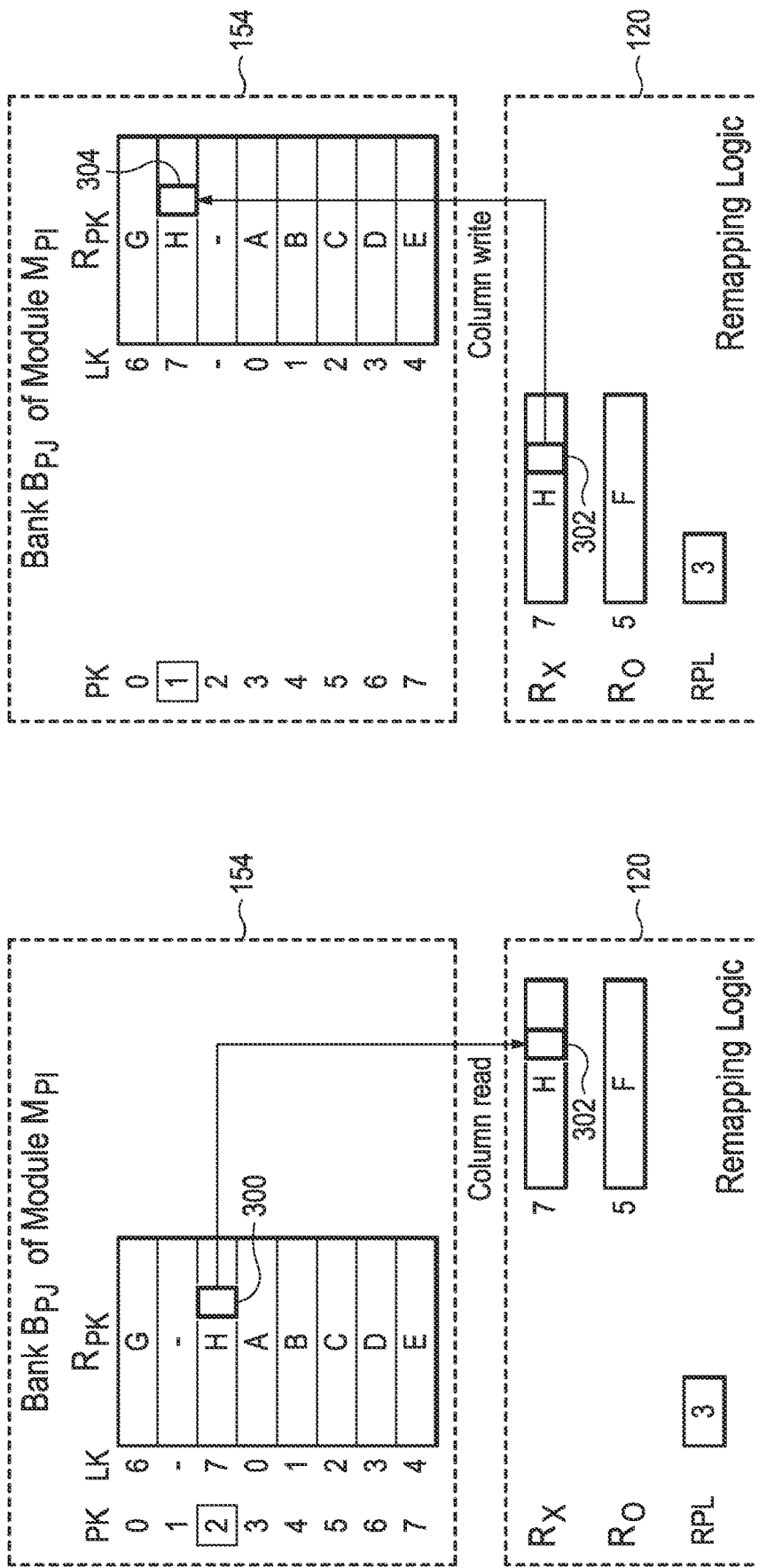
FIG. 3A is a conceptual diagram illustrating copying a row of data from a memory bank into a coherency data register by a series of column read operations.
FIG. 3B is a conceptual diagram illustrating copying a row of data from a coherency data register into a destination physical location in a memory bank into a by a series of column write operations.
FIG. 4 is a simplified timing diagram illustrating coordination of the data movements of FIGS. 3A-3B with burst refresh operations.

FIGS. 3A-3B illustrate aspects of the present remapping example in greater detail. Here, it is assumed that transfer (remapping) is scheduled before or after a maintenance operation such as a refresh operation. In an embodiment, the data transfers are conducted one column at a time. In other embodiments data transfers may be conducted multiple columns at a time, up to an entire row. In other embodiments, the transfer size may be varied dynamically, for example responsive to loading on the request queue. We describe the single-column embodiment for illustration. Referring first to FIG. 3A, it illustrates a column read operation in row PK=2 (data H). Here, one column 300 is being moved (as part of a sequence of column transfers) into the coherency register RX at 302. This is part of the transfer illustrated at snapshots (iv) and (v) in FIG. 2. The column by column transfer is repeated until the data word has been copied.

In some embodiments (not shown), error correction or "scrubbing" logic may be coupled to the register Rx in the remapping component. Accordingly, corrected (or confirmed correct) data can be written to the new PK location. This strategy may be used to relieve the controller of conducting separate background scrubbing operations.

FIG. 3B illustrates the column 302 being copied from the Rx register into its new remapped location in row PK=1 at location 304. This process again is repeated until the data word has been copied. This process corresponds to the transfer illustrated at snapshots (v) and (vi) in FIG. 2. FIG. 4 is a timeline illustrating an embodiment in which the remapping 400 is scheduled at the end of a refresh burst. It may also be scheduled at the start (before) the burst refresh. Other transfer scheduling options may include Conditional transfer (for example, conditioned on access request queue load); Adjustable burst size; Perform transfers during selfrefresh; Perform transfers during interface calibration and other maintenance operations; and Error scrubbing by memory controller during transfer, as mentioned above.

The timeline of FIG. 4, while not to scale, is intended to illustrate the relative time required for remapping as a performance consideration. In the context of the foregoing example, the memory may have, for example, a 64B module access granularity. tREF=64 msec storage cell retention interval, tBURST=4 usec burst refresh interval, and tRC=50 nsec row-column cycle. The remapping described above may consume nominally 0.8% of the memory bandwidth. In the above example, we assume a read or write of 32 bits per device (64B per module). This would require on the order of 5 hours to remap every logical row to a new physical row, for every row of every bank of every device of one module. In some embodiments, transfer operations may be conditionally deferred to idle periods. In other designs, transfer operations by employ a larger burst size. These parameters will vary with different memory components, controller designs and implementations.

We next describe operation, in one embodiment, for the case of reading or writing a partially transferred row of memory cells. Continuing with the same illustrative example of FIGS. 1-4, FIG. 5A illustrates a write operation to a partially transferred row. Here, LK=7 stores data H at PK=2 prior to remapping. Data H is in the process of copying to the register Rx; some columns 500 (in Rx) have been copied while the remaining columns 502 have not. Assume that an access request is executed that writes to a column 510 in the logical row LK=7. This column has not yet been copied to Rx. The write is executed to physical row $R_{PK}$=2 (column 510); and the same write also is executed to the partial row in Rx (corresponding column 512). Sec path 516. By writing the updated column data to both locations, the Rx register will end up with correct data when the H move to Rx is completed, regardless of whether or not the updated column had been copied when the write access occurred. In the case of a read from PK=2, it can be executed normally, as the data H remains stored at PK=2 at least until a complete copy is stored in register Rx, and again, H was updated at PK=2 even though a transfer was "in flight."

Figure 5:
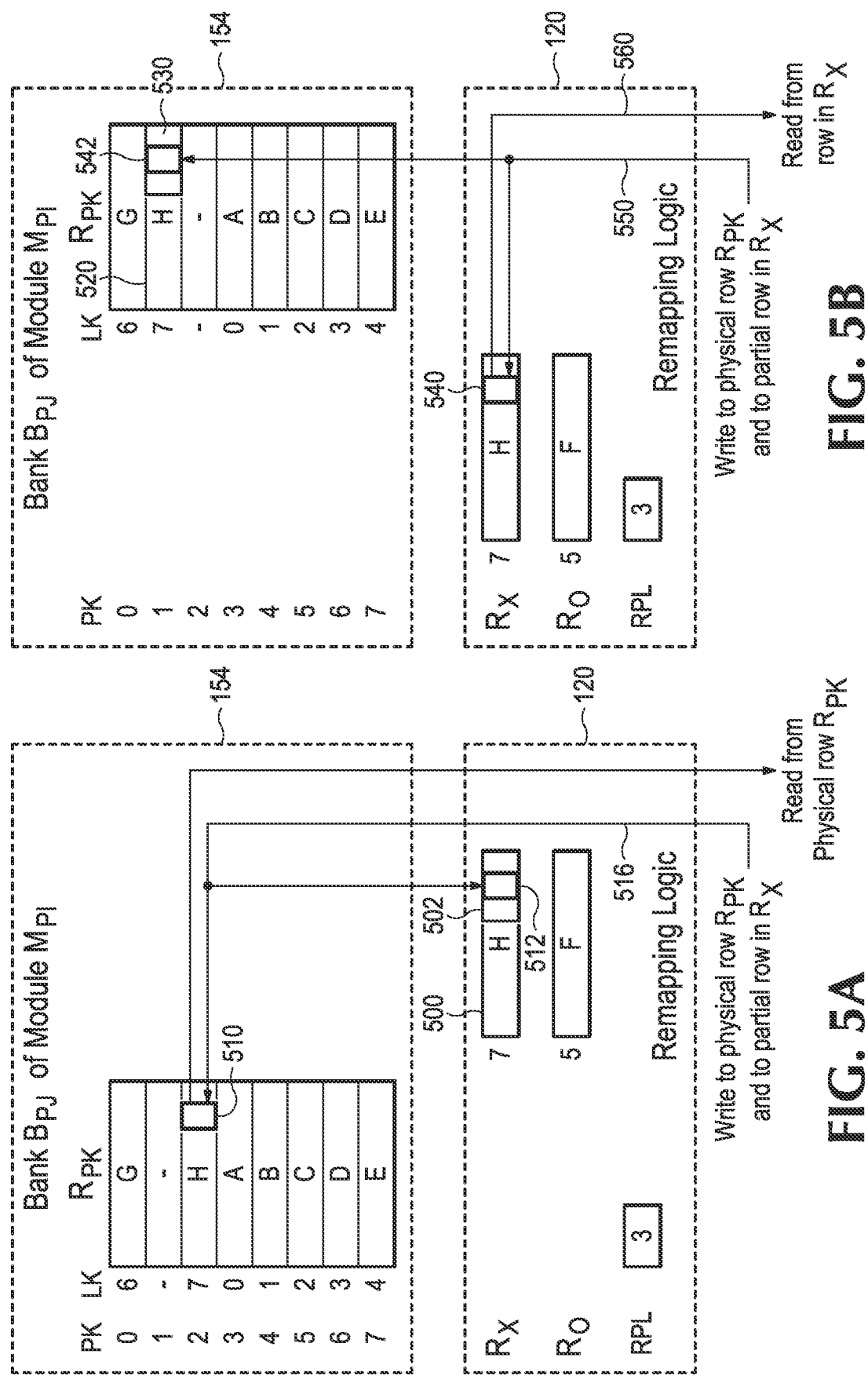
FIG. 5A is a conceptual diagram illustrating normal memory read/write operations involving a row that is partially transferred to a coherency data register.
FIG. 5B is a conceptual diagram illustrating memory read/write operations involving a row that is partially transferred from a coherency data register to a new physical row location in the memory bank.

FIG. 5B represents a point in time at which data H has been copied from row PK=2 into Rx, and it is now in the process of being moved into PK=1. Some columns 520 have been copied from Rx into PK=1, while other columns 530 have not. Assume that a write access request is serviced that writes to a column 542 in the logical row LK=7. This request results in a write to physical row $R_{PK}$=1 (column 542) and also to the partial row in Rx (corresponding column 540). See path 550.

In the case of a read access in the scenario of FIG. 5B, the read is conducted from the coherency data register Rx, path 560, as the transfer of data H to the new location PK=1 is not yet complete. Nonetheless, because of the described "dual write" the Rx data has been updated by the latest write data.

Figure 6:
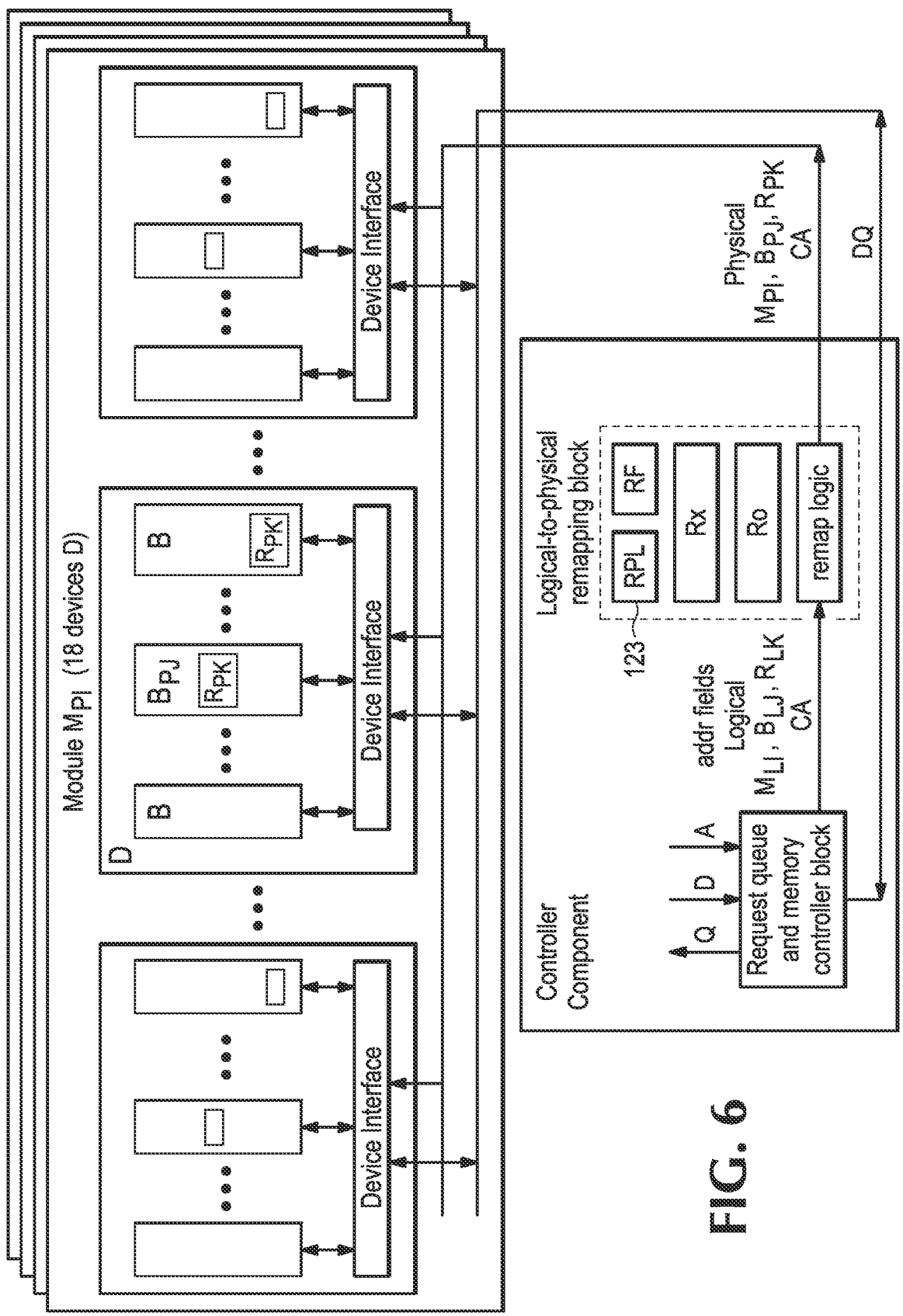
FIG. 6 is a simplified block diagram of a memory system illustrating remapping a row of data to a new physical row address in a different memory bank.

FIG. 6 is in most respects identical to FIG. 1—except that FIG. 6 illustrates remapping a row of data to a new physical row address in a different memory bank. This is another one of the various remapping options discussed earlier. $R_{PK}$ as before indicates a source physical location, while $R_{PK}'$ identifies the corresponding remapped physical location.

Figure 7:
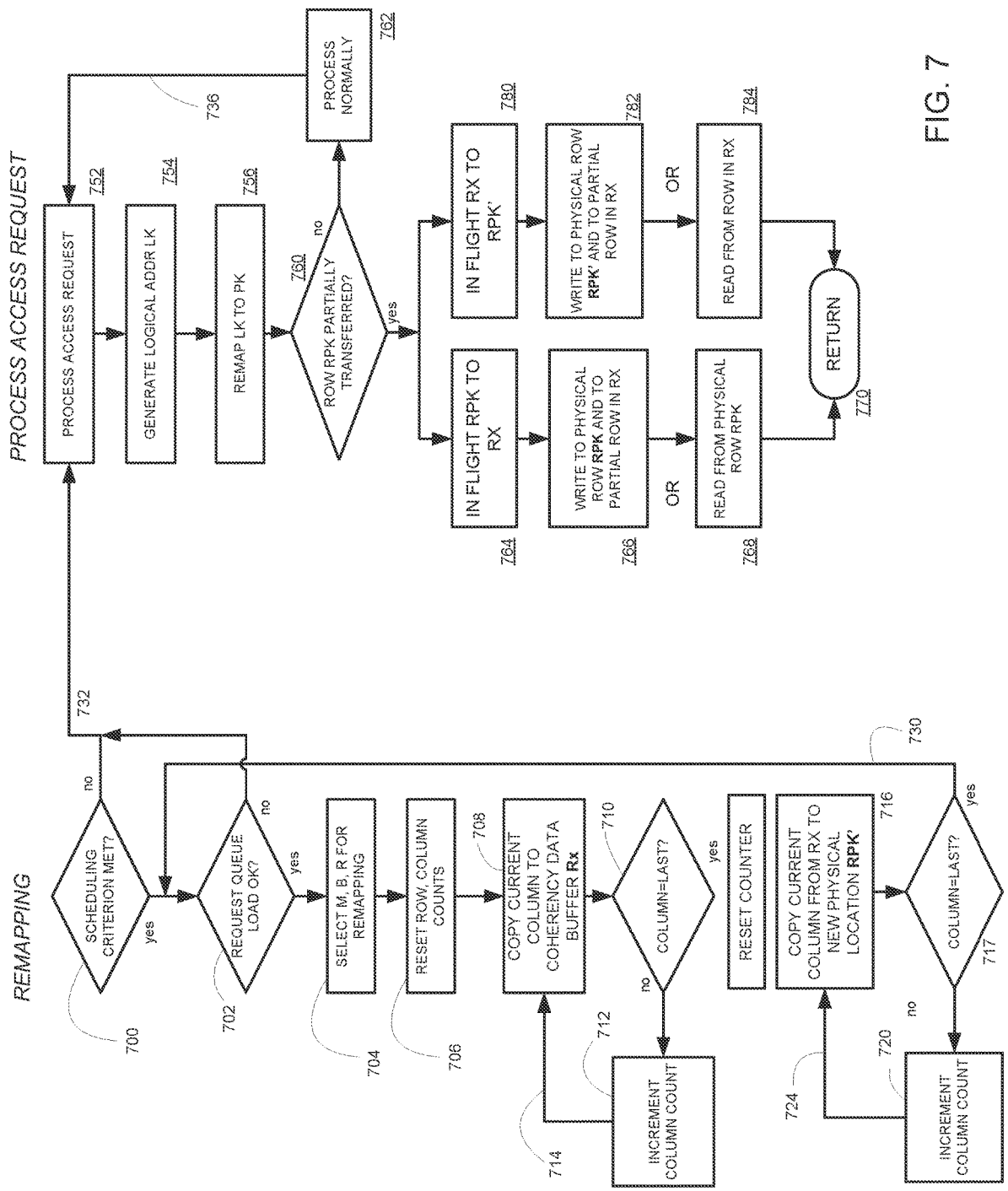
FIG. 7 is a simplified logic flow diagram illustrating an example of a remapping process and a corresponding access request process.

FIG. 7 is a simplified logic flow diagram illustrating operation of one embodiment of a remapping process and a related memory access process. The left side of the diagram illustrates an example of a remapping process. Decision 700 determines whether scheduling criteria are met, in order to begin a remapping operation. For example, in some embodiments, remapping may be scheduled to take place immediately before or after refresh, or other maintenance operations. In some embodiments, remapping may be conditionally deferred to idle periods, for example to minimize read latency impact. If conditions are met to enable remapping operations, the process continues in this example to decision 702. Decision 702 determines whether the memory access request queue loading is acceptable. That is, in an embodiment, if the number of requests currently pending in the request queue exceeds a predetermined threshold, remapping operations may be deferred, and instead memory access requests that are pending may be processed. Continuing from decision 702, if the current request queue loading is okay, the process continues to block 704, to select a memory module, bank and row address for remapping. In an embodiment, the steps described in this flow diagram may be carried out by the remapping block 120 shown in FIG. 1.

At block 706, row and column counters may be reset to begin the remapping operation. Next, at block 708, the logic begins by copying the contents (data) of the current column to a coherency data buffer RX. The coherency data buffer may be implemented, for example, as a register such as 127 in the remapping block 120 of FIG. 1. Next, decision 710 determines whether the current column counter points to the last column. If not, at block 712, the logic increments the column counter and proceeds via path 714 to block 708 to copy the next column of data. This loop continues until the last column of the selected word is copied to the coherency buffer RX. Then the logic resets the column counter, and enters block 716.

Block 716 begins a process of copying the data from the coherency buffer RX to the new physical location RPK'. After block 716 is executed, decision 717 determines whether the column counter currently points to the last column. (Various implementations of counters, registers, and logic, realized in hardware and or software/firmware, may be used. The specifics are not critical. For example, the column counter used for transfers into RX may or may not be the same as the column counter used for transfers out of RX.) If the column count is not at the last column, the column count is incremented at block 720, and this process repeats via loop 724 back to block 716 to copy the next column. This loop continues until all of the columns of the current word have been copied from the coherency data buffer RX into the new physical location. After that copy process is completed, decision 717, the remapping process loops back via path 730 and again enters the decision 702 to determine their loading on the request queue. As before, if the loading does not exceed a predetermined threshold, the next remapping operation can proceed.

If the applicable scheduling criteria for remapping operations are not met, decision 700, or the queue loading is unacceptable, the logic proceeds via path 732 to service the access request queue, beginning at block 752. An access request is fetched from the request queue, and the memory control block generates a logical address LK corresponding to the requested memory access, block 754. Next, at block 756, the remap logic re-maps the logical address LK to a new physical address PK, as discussed earlier. Next, decision 760 determines whether the physical row RPK has been partially transferred to a new location. If that is not the case, in other words, if moving of the relevant data has been completed or has not started, then the access request is processed normally, at block 762, and the process loops back via path 736 to fetch the next access request at block 752.

If it is determined at decision 760 that the relevant row RPK has been partially transferred, then the next steps depend upon of the state of that transfer. On the one hand, the row may be "in flight" from RPK to RX. That is, a row may be in the process of being copied from its current physical location to the coherency data buffer RX. This process was illustrated in FIG. 3A. In an embodiment it also corresponds generally to the steps 708, 710, 712 and loop path 714 in FIG. 7 mentioned above. On the other hand, the row of interest may be "in-flight" from RX to our PK'. That is, the row of interest may be in the process of being moved from the coherency data buffer to the new, remapped physical location. This process was illustrated in FIG. 3B. In either situation, the remapping is incomplete. Nevertheless, access requests can be serviced correctly as discussed above with regard to FIGS. 5A-5B.

In the first case, indicated at block 764, the process proceeds to block 766 in the case of a write command. Here, data is written to the physical row are PK and also to the partial row in RX. Alternatively, if the access request is a read command, then data is read from the physical row RPK, block 768. Referring now to block 780, we describe the case where the row of interest is in the process of transfer from RX to RPK'. Here, in the case of a write command, block 782, the write operation is executed to the remapped physical row RPK' and additionally to the partial row in RX. Alternatively, in the case of a read command, the read is executed from the row stored in RX, see block 784. In this way, correct data are written, or read, as appropriate.

It will be obvious to those having skill in the art that many changes may be made to the details of the above-described embodiments without departing from the underlying principles of the invention. The scope of the present invention should, therefore, be determined only by the following claims.

The invention claimed is:

1. A memory controller comprising:
   a request queue configured to store memory access requests for a memory component, each memory access request pertaining to data having an associated logical address in the memory component; and
   a remapping block configured to:
      determine whether a scheduling criterion associated with remapping the associated logical address of the data has been satisfied;
      responsive to determining that the scheduling criterion has been satisfied, determine whether loading of the request queue exceeds a predetermined threshold;
      responsive to determining that the loading of the request queue exceeds the predetermined threshold, defer mapping the associated logical address of the data; and
      process pending memory access requests from the request queue on the memory component.

2. The memory controller of claim 1, wherein:
   the remapping block comprises remapping logic, a holding data register, and a coherency data register;
   the holding data register is accessible to the remapping logic for temporary data storage during data relocation; and
   the coherency data register is accessible to the remapping logic to maintain data coherency during data relocation.

3. The memory controller of claim 1, further comprising:
   an offset register configured to store a number of rows of offset between a logical address and a corresponding physical address of data stored in the memory component.

4. The memory controller of claim 2, wherein the remapping block is further configured to:
   responsive to determining that the loading of the request queue does not exceed the predetermined threshold, move data in each of a plurality of rows of the memory component from an original address to a different physical address in the memory component.

5. The memory controller of claim 4, wherein to move the data, the remapping block is further configured to:
   copy first data from a first row of the memory component to the holding data register;
   copy second data from a second row of the memory component to the coherency data register;
   copy the second data from the coherency data register to the first row in the memory component; and
   copy the first data from the holding data register to a destination row in the memory component, wherein the destination row is different than the first row.

6. The memory controller of claim 1, wherein to determine whether the scheduling criterion associated with remapping the associated logical address of the data has been satisfied, the remapping block is to determine whether a memory component maintenance operation has been performed on the memory component.

7. The memory controller of claim 1, wherein to determine whether the loading of the request queue exceeds the predetermined threshold, the remapping block is to determine whether a number of pending memory access requests in the request queue that have not been processed exceeds the predetermined threshold.

8. A method for operating a memory controller comprising:
   storing memory access requests for a memory component in a request queue, each memory access request pertaining to data having an associated logical address in the memory component;
   determining whether a scheduling criterion associated with remapping the associated logical address of the data has been satisfied;
   responsive to determining that the scheduling criterion has been satisfied, determining whether loading of the request queue exceeds a predetermined threshold;
   responsive to determining that the loading of the request queue exceeds the predetermined threshold, deferring mapping the associated logical address of the data; and
   processing pending memory access requests from the request queue on the memory component.

9. The method of claim 8, further comprising:
   responsive to determining that the loading of the request queue does not exceed the predetermined threshold, moving data in each of a plurality of rows of the memory component from an original address to a different physical address in the memory component.

10. The method of claim 9, further comprising:
    scheduling the moving in conjunction with a refresh operation.

11. The method of claim 9, wherein the moving is executed in conjunction with error scrubbing.

12. The method of claim 9, wherein moving the data comprises:
    copying first data from a first row of the memory component to a first register;
    copying second data from a second row of the memory component to a second register;
    copying the second data from second register to the first row in the memory component; and copying the first data from the first register to a destination row in the memory component, wherein the destination row is different than the first row.

13. The method of claim 8, wherein determining whether the scheduling criterion associated with remapping the associated logical address of the data has been satisfied comprises determining whether a memory component maintenance operation has been performed on the memory component.

14. The method of claim 8, wherein determining whether the loading of the request queue exceeds the predetermined threshold comprises determining whether a number of pending memory access requests in the request queue that have not been processed exceeds the predetermined threshold.

15. A memory module comprising:
  a memory component; and
  a memory controller, the memory controller comprising:
    a request queue configured to store memory access requests for the memory component, each memory access request pertaining to data having an associated logical address in the memory component; and
    a remapping block configured to:
      determine whether a scheduling criterion associated with remapping the associated logical address of the data has been satisfied;
      responsive to determining that the scheduling criterion has been satisfied, determine whether loading of the request queue exceeds a predetermined threshold;
      responsive to determining that the loading of the request queue exceeds the predetermined threshold, defer mapping the associated logical address of the data; and
      process pending memory access requests from the request queue on the memory component.

16. The memory module of claim 15, wherein:
the remapping block comprises remapping logic, a holding data register, and a coherency data register;
the holding data register is accessible to the remapping logic for temporary data storage during data relocation; and
the coherency data register is accessible to the remapping logic to maintain data coherency during data relocation.

17. The memory module of claim 15, wherein the memory controller further comprises:
  an offset register configured to store a number of rows of offset between a logical address and a corresponding physical address of data stored in the memory component.

18. The memory module of claim 16, wherein the remapping block is further configured to:
  responsive to determining that the loading of the request queue does not exceed the predetermined threshold, move data in each of a plurality of rows of the memory component from an original address to a different physical address in the memory component.

19. The memory module of claim 18, wherein to move the data, the remapping block is further configured to:
  copy first data from a first row of the memory component to the holding data register;
  copy second data from a second row of the memory component to the coherency data register;
  copy the second data from the coherency data register to the first row in the memory component; and
  copy the first data from the holding data register to a destination row in the memory component, wherein the destination row is different than the first row.

20. The memory module of claim 15, wherein:
to determine whether the scheduling criterion associated with remapping the associated logical address of the data has been satisfied, the remapping block is to determine whether a memory component maintenance operation has been performed on the memory component; and
to determine whether the loading of the request queue exceeds the predetermined threshold, the remapping block is to determine whether a number of pending memory access requests in the request queue that have not been processed exceeds the predetermined threshold.

* * * * *